US012730854B2

(12) United States Patent
Cavalli et al.

(10) Patent No.: US 12,730,854 B2

(45) Date of Patent: Sep. 8, 2026

(54) SYSTEMS AND METHODS FOR RENDERING A PAGE VIA ISOLATED RUNTIME ENVIRONMENTS

(71) Applicant: Veeva Systems Inc., Pleasanton, CA (US)

(72) Inventors: Adam Cavalli, New York, NY (US); David John Mills, Pleasanton, CA (US); Christopher Michael Rink, Danville, CA (US); Matthew Allen King, Oakland, CA (US); Sean McCollum, San Francisco, CA (US)

(73) Assignee: Veeva Systems, Inc., Pleasanton, CA (US)

( * ) Notice: Subject to any disclaimer, the term of this patent is extended or adjusted under 35 U.S.C. 154(b) by 0 days.

(21) Appl. No.: 19/427,437

(22) Filed: Dec. 19, 2025

(65) Prior Publication Data

US 2026/0178681 A1 Jun. 25, 2026

Related U.S. Application Data

(60) Provisional application No. 63/736,587, filed on Dec. 19, 2024.

(51) Int. Cl.
*G06F 16/957* (2019.01)
*G06F 16/958* (2019.01)

(52) U.S. Cl.
CPC ........ *G06F 16/9577* (2019.01); *G06F 16/958* (2019.01)

(58) Field of Classification Search
CPC .......................... G06F 16/9577; G06F 16/958
See application file for complete search history.

(56) References Cited

U.S. PATENT DOCUMENTS

| | | | | |
|---|---|---|---|---|
| 2016/0057220 A1* | 2/2016 | Gibbs | G06F 8/65 709/203 |
| 2023/0004637 A1* | 1/2023 | Wang | G06F 21/53 |
| 2023/0153372 A1* | 5/2023 | Jacobsen | G06F 8/74 715/234 |
| 2024/0211219 A1* | 6/2024 | Fang | G06F 9/548 |
| 2024/0346105 A1* | 10/2024 | Hurley | G06F 16/986 |
| 2025/0278548 A1* | 9/2025 | Ronan | G06F 40/143 |

* cited by examiner

*Primary Examiner* — Asher D Kells

(57) ABSTRACT

A method for executing sets of code in isolated runtime environments includes selecting a platform package from a platform repository. The platform package includes platform code and a first code library. The method includes selecting a platform bundle from the platform repository. The platform bundle includes a first stylesheet library. The method includes selecting a tenant package from a tenant repository. The tenant package includes platform code and a second code library. The method includes selecting a tenant bundle from the tenant repository. The platform bundle includes a second stylesheet library. The method further includes transmitting the page file, the tenant package, the tenant bundle, the platform package, and the platform bundle to a user computing device. The platform code is executed in isolation of the tenant code, and the tenant code is executed in isolation of the platform code.

20 Claims, 11 Drawing Sheets

SYSTEMS AND METHODS FOR RENDERING A PAGE VIA ISOLATED RUNTIME ENVIRONMENTS

CROSS-REFERENCE TO RELATED APPLICATIONS

This application claims priority to U.S. Provisional Patent Application No. 63/736,587, filed Dec. 19, 2024, which is incorporated herein by reference in its entirety.

TECHNICAL FIELD

The present disclosure relates to systems and methods for rendering a page via isolated runtime environments.

BACKGROUND

Researchers, scientists, industry players, academics, government regulators, and other stakeholders are increasingly in need of efficient and simple ways to display and render webpages.

SUMMARY

An example embodiment disclosed herein relates to a method for executing sets of code in isolated runtime environments to aid in rendering a single user interface. The method includes receiving a request to render a page file including an embedded container and selecting a platform package from a platform repository based on the request. The platform package includes platform code and a first code library. The method further includes selecting a platform bundle from the platform repository based on the request. The platform bundle includes a first stylesheet library. The method further includes selecting a tenant package from a tenant repository based on the request. The tenant package includes platform code and a second code library. The method further includes selecting a tenant bundle from the tenant repository based on the request. The platform bundle includes a second stylesheet library. The method further includes transmitting the page file, the tenant package, the tenant bundle, the platform package, and the platform bundle to a user computing device. The platform code of the platform package provides instructions configured to cause the user computing device to: generate a document object model (DOM) tree based on the page file; and modify the DOM tree. The tenant code of the tenant package provides instructions configured to cause the user computing device to: generate a shadow DOM depending from the DOM tree; and modify the shadow DOM. The platform code is executed in isolation of the tenant code, and the tenant code is executed in isolation of the platform code.

Another embodiment relates to a method for executing sets of code in isolated runtime environments to aid in rendering a single user interface. The method includes receiving a request and selecting a platform distribution file from a platform repository based on the request. The platform distribution file includes a page file, a platform package, and a platform bundle. The platform package includes platform code and a first code library. The platform bundle includes a first stylesheet library. The method further includes selecting a tenant distribution file from a tenant repository based on the request. The tenant distribution file includes a tenant package and a tenant bundle. The tenant package includes platform code and a second code library. The platform bundle includes a second stylesheet library.

The method further includes transmitting the tenant distribution file and the platform distribution file to a user computing device. The platform code of the platform package provides instructions configured to cause the user computing device to: generate a document object model (DOM) tree based on the page file; and modify the DOM tree. The tenant code of the tenant package provides instructions configured to cause the user computing device to: generate a shadow DOM depending from the DOM tree; and modify the shadow DOM. The platform code is executed in isolation of the tenant code, and the tenant code is executed in isolation of the platform code.

Another embodiment relates to a method for executing sets of code in isolated runtime environments to aid in rendering a single user interface. The method includes receiving a request to render a page file including an embedded container and selecting a platform distribution file from a platform repository based on the request. The platform distribution file includes a platform package and a platform bundle. The platform package includes platform code and a first code library. The platform bundle includes a first stylesheet library. The method further includes selecting a tenant distribution file from a tenant repository based on the request. The tenant distribution file includes a tenant package and a tenant bundle. The tenant package includes platform code and a second code library. The platform bundle includes a second stylesheet library. The method further includes outputting the page file, the platform distribution file, and the tenant distribution file to a user computing device. The method further includes generating, by the user computing device, a document object model (DOM) tree based on the page file. The method further includes generating, by the user computing device, a shadow DOM depending from the DOM tree. The method further includes executing, by the user computing device, the platform code in isolation of the platform code to modify the DOM tree, and executing, by the user computing device, the tenant code in isolation of the platform code to modify the shadow DOM.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

The present disclosure arises from the realization that in modern multi-tenant web environments, executing code from multiple sources (e.g., a host platform and third-party tenants) within a single browser interface presents significant stability and security challenges. Because standard web documents share a global execution scope, code from one tenant can inadvertently overwrite the styles or variables of the platform, leading to the page requiring a single consistent style or variable, or the page throwing exceptions. In that regard, unhandled exceptions in tenant code can destabilize the entire user interface. Existing solutions, such as simple iframes, often suffer from performance penalties and rigid layout constraints, while direct DOM injection lacks necessary isolation.

The present disclosure addresses these issues by providing a hybrid isolation architecture. In one embodiment, the system utilizes Shadow DOM technology to provide for isolation in styles between elements of the webpage. Simultaneously, the system employs isolated runtimes via iframe environments to provide for isolation in code, and allow for separate code libraries to be utilized. This allows the tenant code to run in isolation of the tenant code, thereby using unique libraries, frameworks, and the like. This architecture improves the functioning of the computing device by providing for enhanced style separation, code separation, and overall isolation between tenant code and platform code, which results in faster, less error-prone execution, and custom control of the page itself.

For instance, the present systems and methods provide for true scope isolation. In a standard web app, the window object is the Global Scope, and in that situation if the platform code uses React v18 and tenant code uses React v16, they will fight over window. React, thereby causing slow performance and requiring more processing power, and throwing more errors during execution. In comparison, the present systems and methods execute the code (eg., JavaScript) inside the iframe, and the code gets its own fresh window object and its own heap. So, the tenant code can install React v16 inside the iframe, and the platform code can use React v18.

Figure 1:
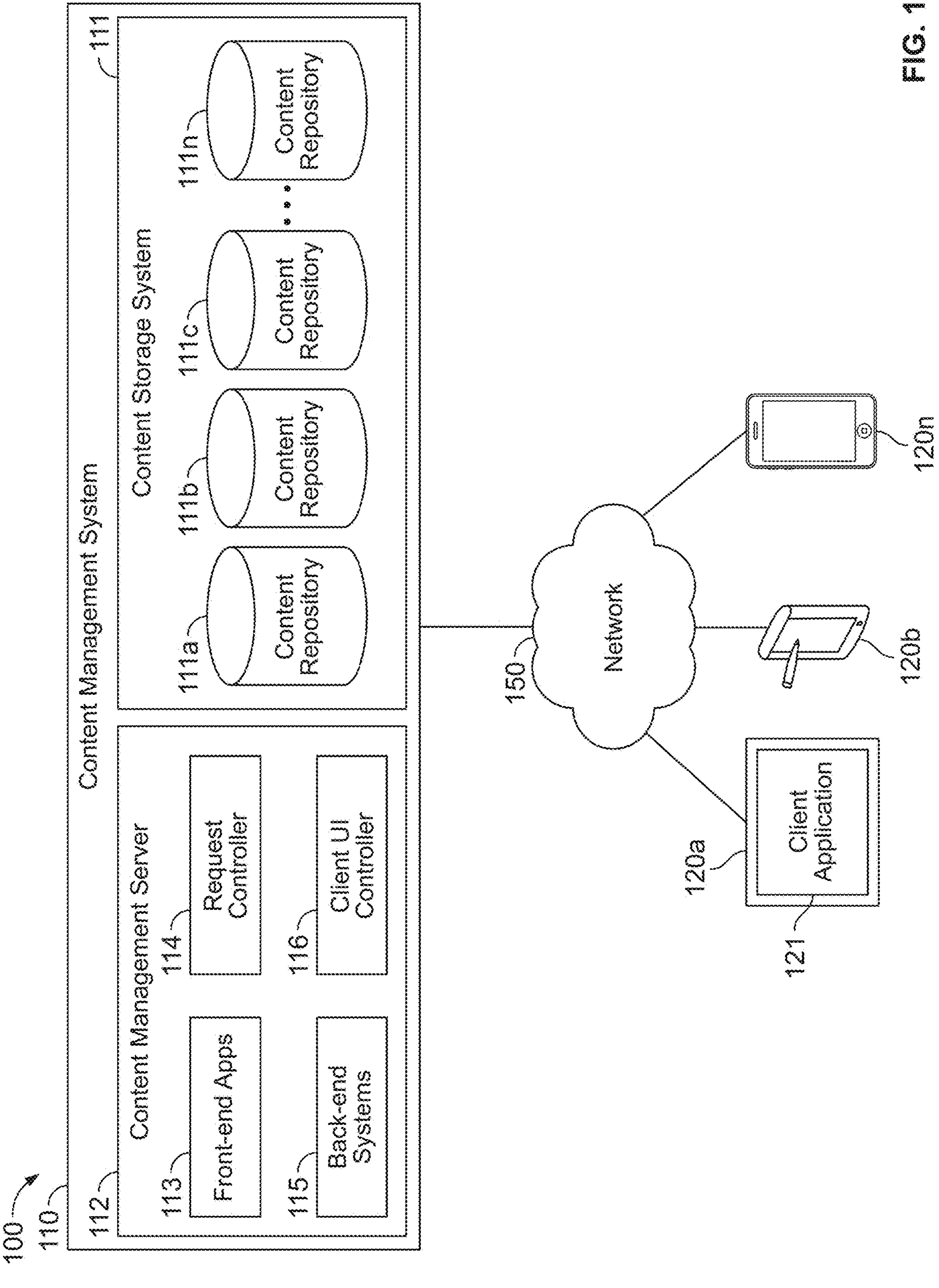
FIG. 1 illustrates an example high level block diagram of an enterprise content management architecture, according to an example embodiment.

Referring now to FIG. 1 illustrates a high-level block diagram of an enterprise content management architecture 100 is shown, according to an example embodiment. The enterprise may be a business, an organization, or the like. As shown, the architecture 100 may include a content management system 110, and a plurality of user computing devices 120*a*, 120*b*, . . . 120*n*, coupled to each other via a network 150. The content management system 110 may include a content storage system 111 and a content management server 112. The content storage system 111 may have two or more content repositories, e.g., 111*a*, 111*b*, 111*c* . . . and 111*n*. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120*a*-120*n* may be any machine or system that is used by a user to access the content management system 110 via the network 150, and may be any commercially available computing devices including laptop computers, desktop computers, mobile phones, smart phones, tablet computers, netbooks, and personal digital assistants (PDAs). A client application 121 may run from a user computing device, e.g., 120*a*, and access content in the content management system 110 via the network 150. User computing devices 120*a*-120*n* are illustrated in more detail in FIG. 4.

The content storage system 111 may store content that client applications (e.g., 121) in user computing devices 120*a*-120*n* may access and may be any commercially available storage devices. Each content repository (e.g., 111*a*, 111*b*, 111*c* or 111*n*) may store content, including source code and/or stylesheets for a specific tenant. Code and stylesheets from different tenants may be executed in the content management server 112, but each tenant's data is segregated from other tenants' data in the content storage system 111 by being stored in a separate content repository.

The content management server 112 is typically a remote computer system accessible over a remote or local network, such as the network 150. The content management server 112 could be any commercially available computing devices. A client application (e.g., 121) process may be active on one or more user computing devices 120*a*-120*n*. The corresponding server process may be active on the content management server 112, as one of the front-end applications 113 described with reference to FIG. 2. The client application process and the corresponding server process may communicate with each other over the network 150, thus providing distributed functionality and allowing multiple client applications to take advantage of the information-gathering capabilities of the content management system 110.

In one implementation, the content management server 112 may include a request controller 114 which may receive requests to render a page including an embedded container or HTML element and process the requests by retrieving tenant packages and/or platform packages to generate and render the page on the user computing device (e.g., 120*a*-120*n*). In some embodiments, the request controller 114 may determine the corresponding tenant packages and/or platform packages based on the request and the page identified in the request.

In one implementation, the content management server 112 may include a client user interface (UI) controller, which may retrieve a tenant bundle and platform bundle, and then execute tenant code and/or platform code of the respective packages in isolation (e.g., such that code, data, and/or libraries do not intermingle between each package) to generate an embedded container framework and a page framework to then render the page on the user computing device, as discussed with regard to the method 900. In some embodiments, the tenant code may be structured according to a specific programming language including JavaScript, Ruby, React, Rust, and the like.

Although the front-end applications 113, the back-end systems 115, the request controller 114, and the client UI controller 116, are shown in one server, it should be understood that they may be implemented in multiple computing devices.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
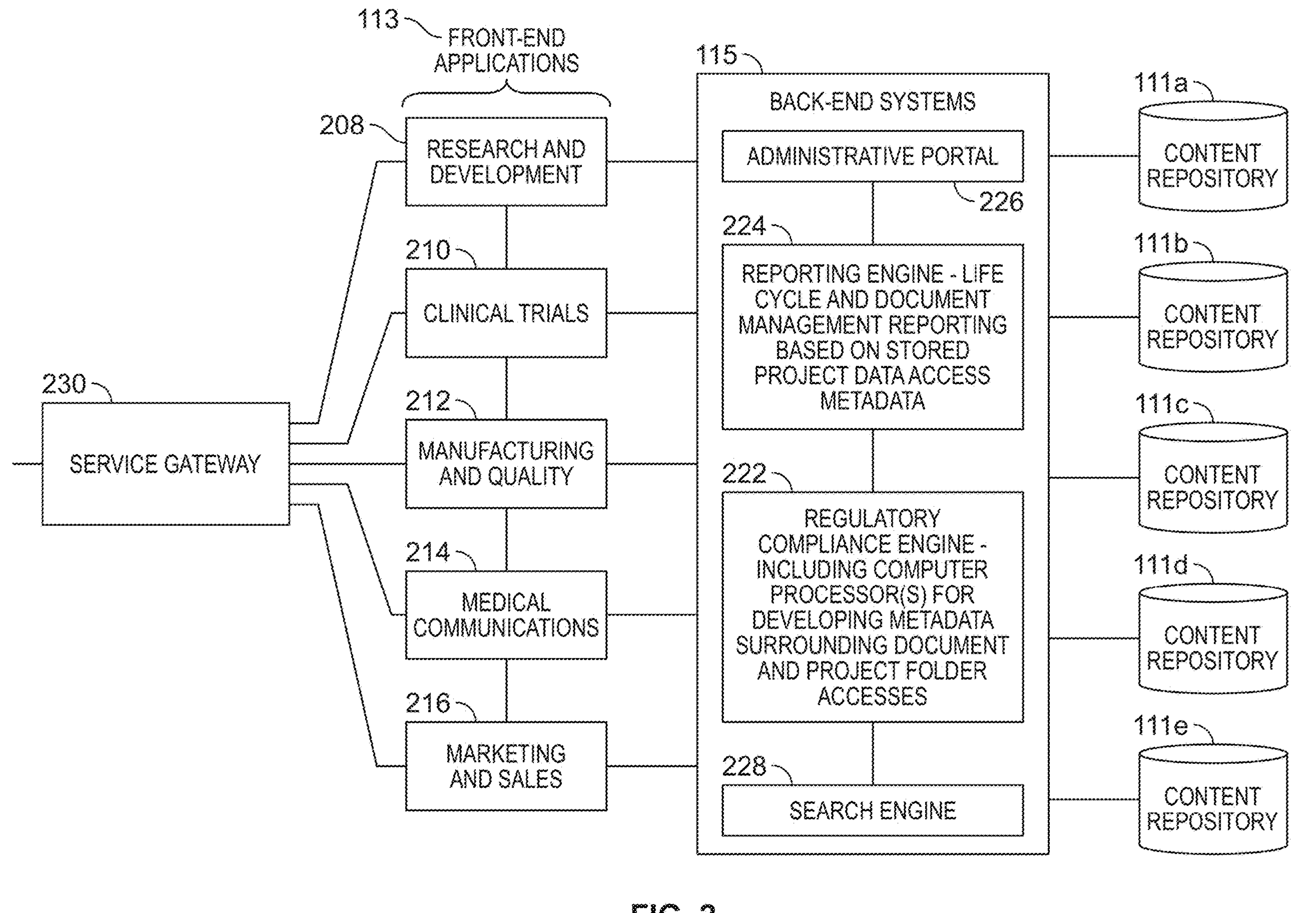
FIG. 2 provides a description of the content management system with additional specific applications and interfaces connected thereto, according to an example embodiment.

FIG. 2 provides a description of the content storage system 111 with additional specific applications and interfaces connected thereto, according to an example embodiment. In an embodiment, this content storage system 111 is a cloud-based or distributed network based system for consolidating an enterprise's data, oftentimes integrating multiple content repositories in an enterprise into a single system having coordinated control, measuring, and auditing of data creation, access and distribution.

In an embodiment of the content storage system 111 for the life sciences industry, as illustrated in the figure, this content storage system 111 can include specific data collections for the following areas and/or business process-specific front-end applications 113:

The Research & Development (R & D) front-end application 208 provides for an aggregation of materials in support of research and initial clinical trial submissions through building organized and controlled content repositories within the content management system 110, more specifically, the content repository 111*a*. Elements that can be stored, organized, and managed through this front-end include submission bills of materials, Drug Information Association (DIA) reference models support, and submission-ready renderings. This front-end 208 is designed to provide an interface to the content management system 110 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the content management system 110 further provides for efficient passing off of content, e.g., in the content repository 111*b*, between this phase and other phases of the life sciences development process.

The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the content management system 110, or more specifically, the content repository 111*c*, whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the content management system 110. Related documents may be stored in the content repository 111*d*.

The marketing and sales application 216 provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the content management system 110, and the promotional materials may be stored in the content repository 111*e*.

In disclosed embodiments, there are provided a number of back-end system applications 115 that provide for the management of the data, forms, and other communications in the content management system 110. For example, the back-end systems applications 115 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 222 may further includes prevalidation functionality to build controlled content in support of installation qualification (IQ) and/or operational qualification (OQ), resulting in significant savings to customers for their system validation costs.

In further disclosed embodiments, the back-end systems 115 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the content management system 110.

In further disclosed embodiments, the back-end systems 115 can include an administrative portal 226 whereby administrators can control documents, properties, users, security, workflow and reporting with a simple, point-and-click web interface. Customers also have the ability to quickly change and extend the applications or create brand new applications, including without writing additional software code.

In further disclosed embodiments, the back-end systems 115 may include a search engine 228 whereby the content management system 110 can deliver simple, relevant and secure searching.

The content management system 110 may have more back-end systems.

In providing this holistic combination of front-end applications 113 and back-end systems 115, the various applications can further be coordinated and communicated with by the service gateway 230, which in turn can provide for communications with various web servers and/or web services APIs. Such web servers and/or web services APIs can include access to the content and metadata layers of some or all of the various front-end applications 113 and back end systems 115, enabling seamless integration among complementary systems.

In the context of the described embodiments, content in one repository, e.g., the content repository 111*a* for the Research & Development (R & D) front-end application 208, may be re-used in another repository (e.g., the content repository 111*d*) with another front-end application (e.g., the medical communications application 214).

The content management system 110 may store content for other industries, such as consumer products or warehouse industries.

Figure 3:
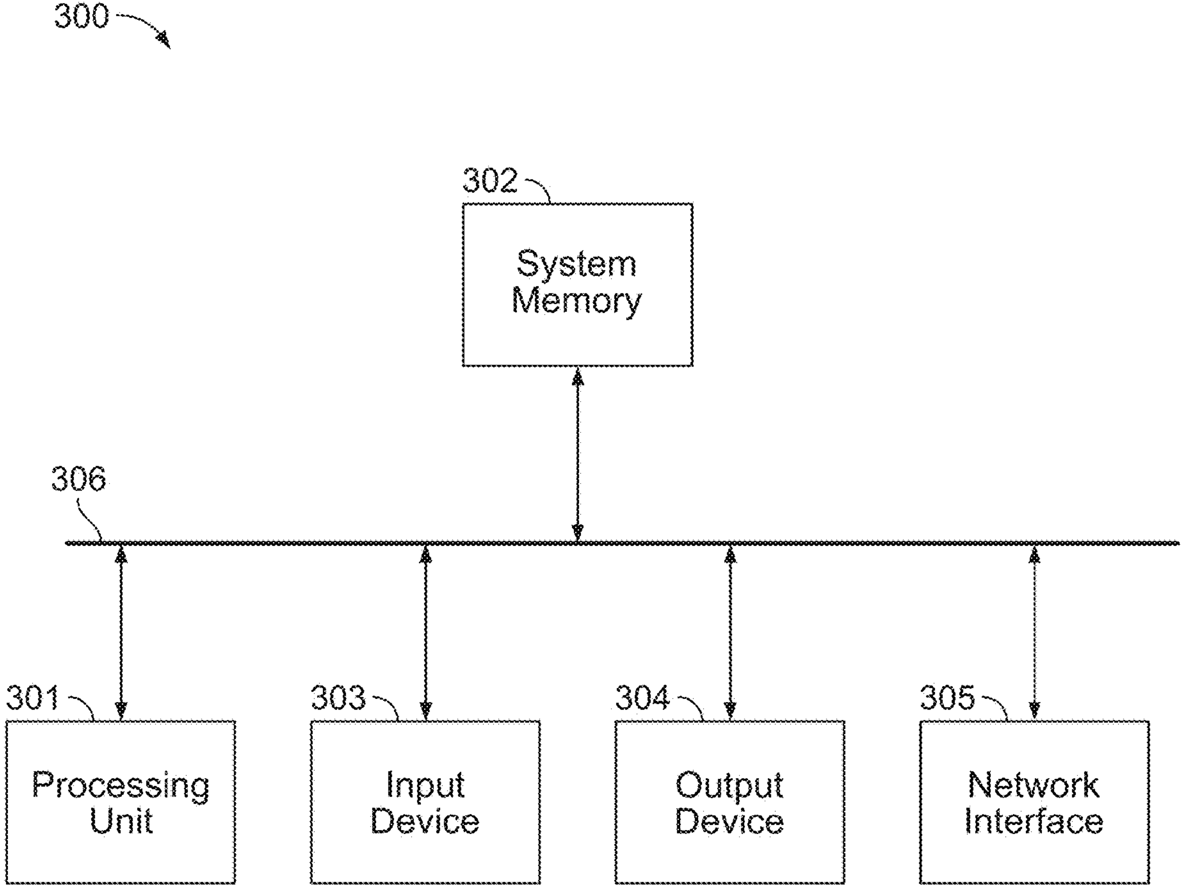
FIG. 3 illustrates an example block diagram of a computing device, according to an example embodiment.

FIG. 3 illustrates an example block diagram of a computing device 300 which can be used as the user computing devices 120*a*-120*n*, and the content management server 112 in FIG. 1, according to an example embodiment. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. The processing unit 301 may be a central processing unit (CPU).

The system memory 302 typically includes a variety of computer readable media which may be any available media accessible by the processing unit 301. For instance, the system memory 302 may include computer storage media in the form of volatile and/or nonvolatile memory such as read only memory (ROM) and/or random access memory (RAM). By way of example, but not limitation, the system memory 302 may store instructions and data, e.g., an operating system, program modules, various application programs, and program data.

A user can enter commands and information to the computing device 300 through the input device 303. The input device 303 may be, e.g., a keyboard, a touchscreen input device, a touch pad, a mouse, a microphone, and/or a pen.

The computing device 300 may provide its output via the output device 304 which may be, e.g., a monitor or other type of display device, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 305 may be configured to allow the computing device 300 to transmit and receive data in a network, for example, the network 150. The network interface 305 may include one or more network interface cards (NICs).

Figure 4:
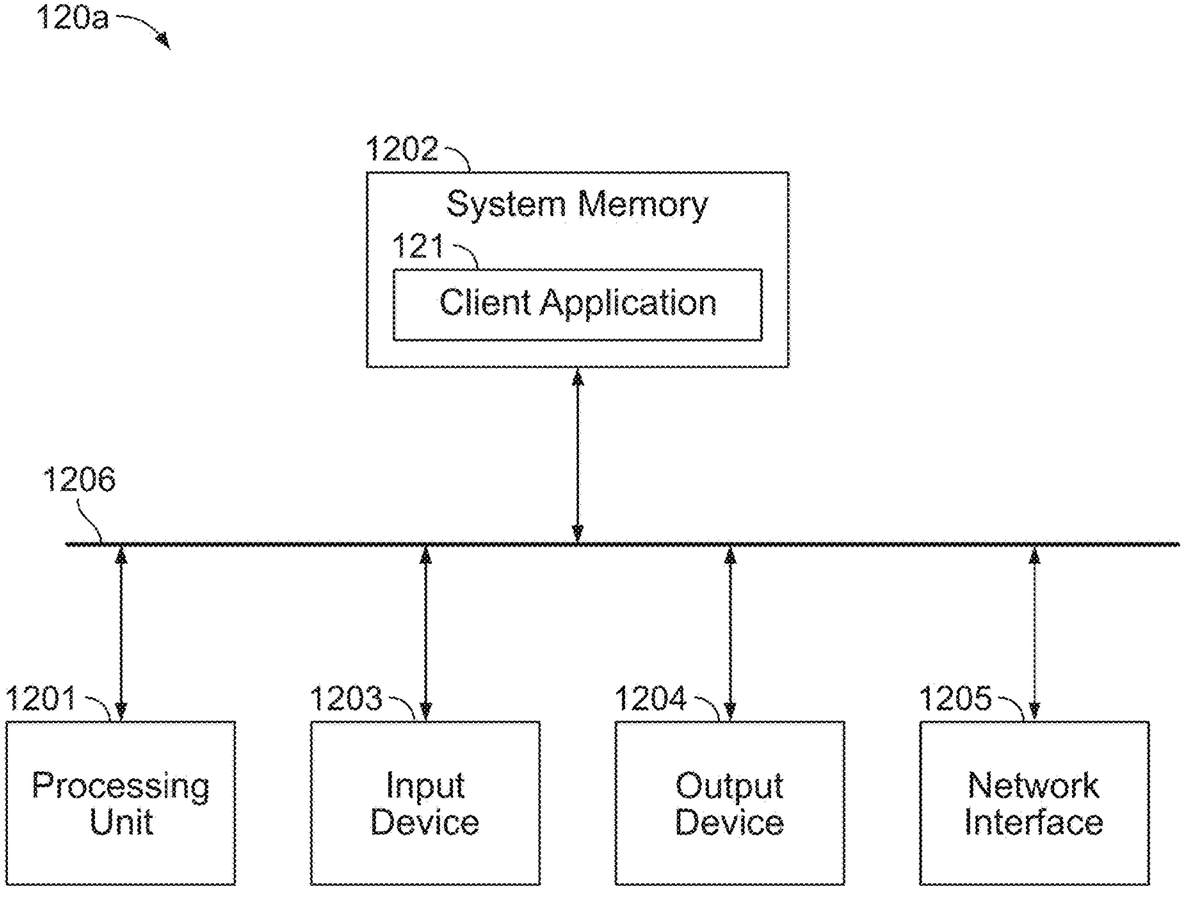
FIG. 4 illustrates an example high level block diagram of a user computing device, according to an example embodiment.

FIG. 4 illustrates an example high level block diagram of a user computing device (e.g., 120*a*) according to an example embodiment. The user computing device 120*a* may be implemented by the computing device 300 described above, and may have a processing unit 1201, a system memory 1202, an input device 1203, an output device 1204, and a network interface 1205, coupled to each other via a system bus 1206. The system memory 1202 may store the client application 121.

Figure 5:
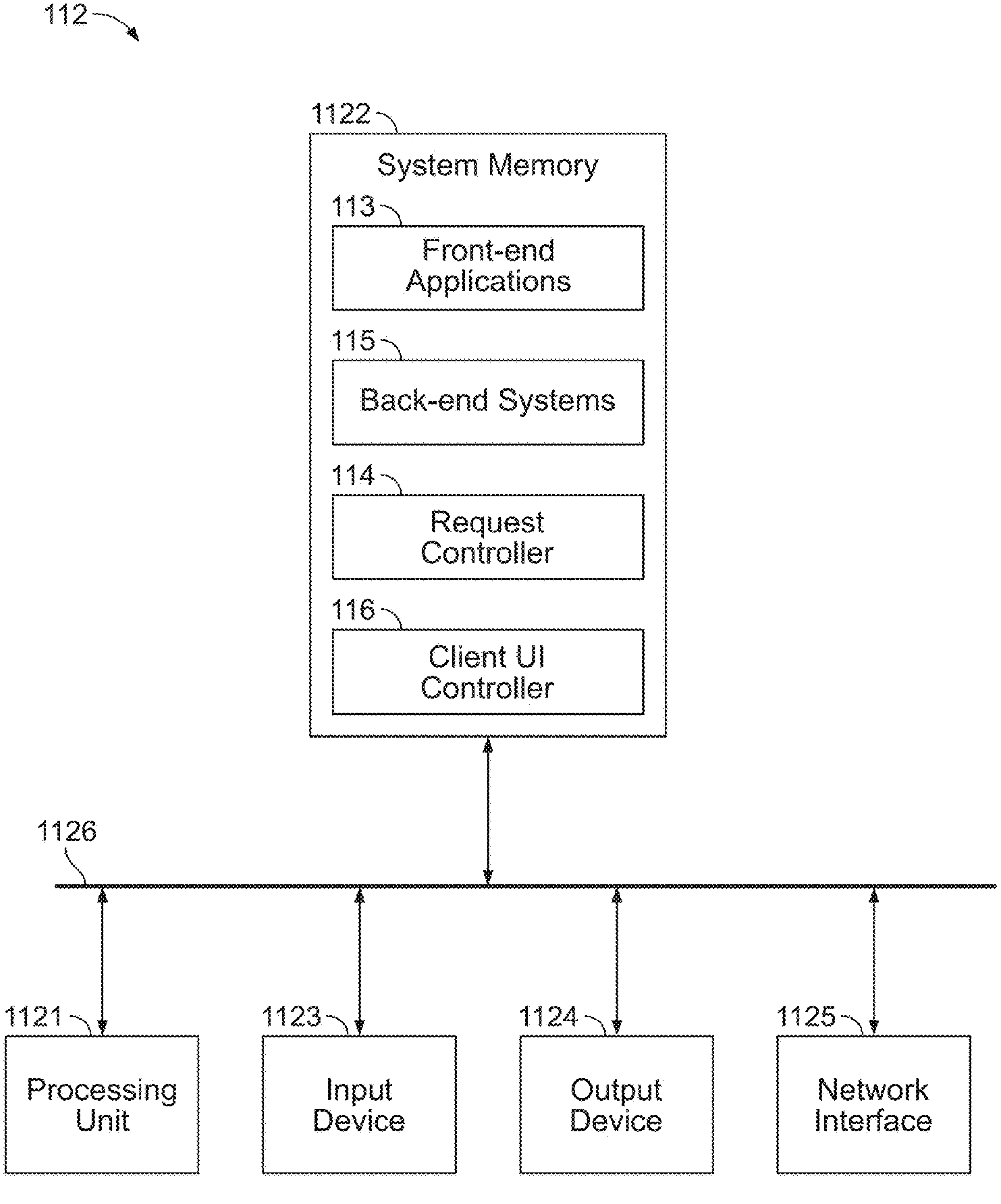
FIG. 5 illustrates an example high level block diagram of the content management server, according to an example embodiment.

FIG. 5 illustrates an example high level block diagram of the content management server 112 according to an example embodiment. The content management server 112 may be implemented by the computing device 300, and may have a processing unit 1121, a system memory 1122, an input device 1123, an output device 1124, and a network interface 1125, coupled to each other via a system bus 1126. The system memory 1122 may store the front-end applications 113, the back-end systems 115, the content sharing controller 114, and the content retaining controller 116.

Figure 6:
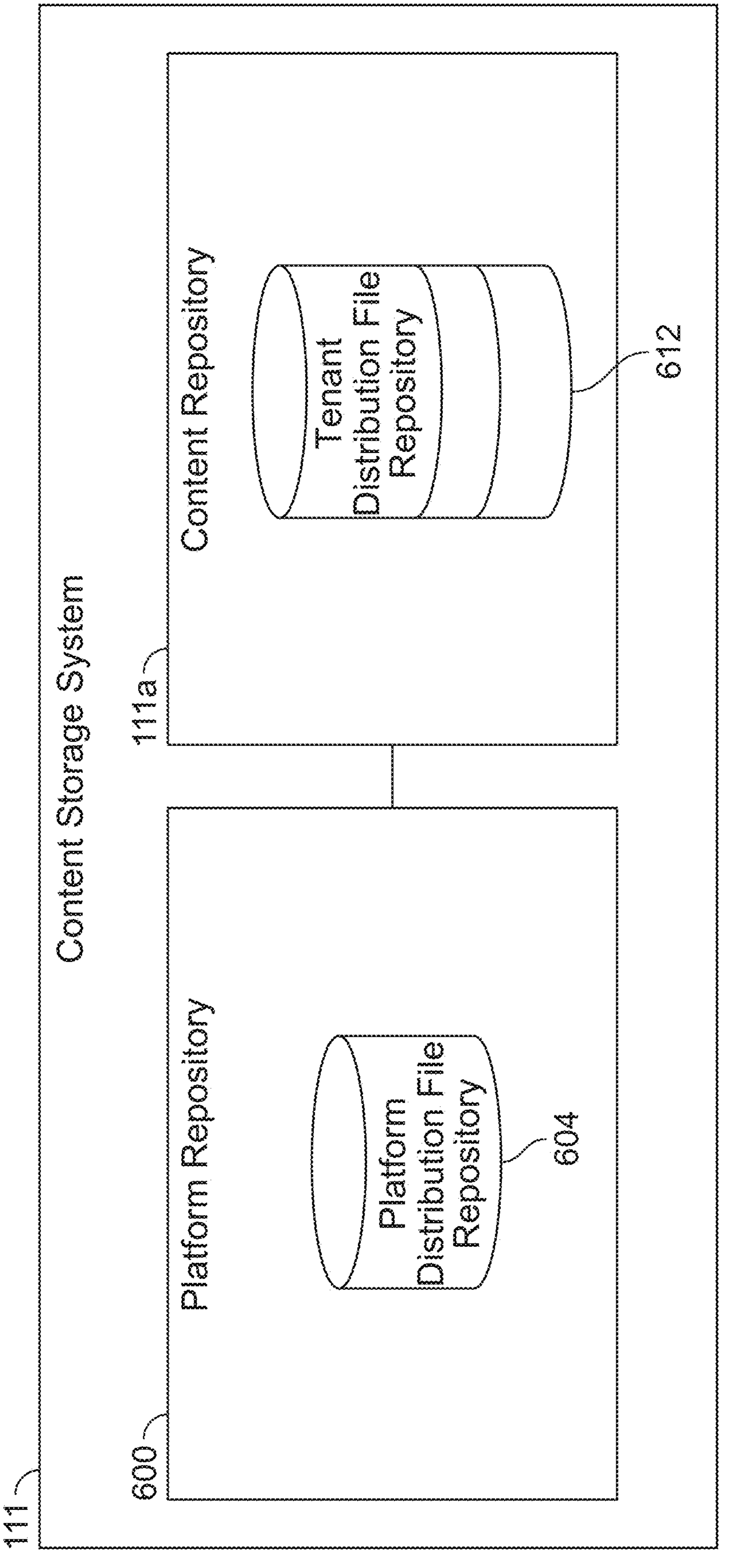
FIG. 6 illustrates an example high level block diagram of a content storage system, according to an example embodiment.

FIG. 6 illustrates an example high level block diagram of the content storage system 111, according to an example embodiment. The content storage system 111 may include the platform repository 600 and multiple content repositories 111*a-n*. The platform repository 600 may serve as a repository to store code, stylesheets, and other data applicable to the entire content management system 110. Accordingly, the platform repository 600 may include one or more platform distribution file repositories 604. In some embodiments, the platform repository 600 may include separate code and CSS repositories (not shown). In some embodiments, the platform repository 600 and the repositories thereof, are maintained by the content management system 111. For instance, the content management system 111 may update or version the data (e.g., the libraries) of the platform repository 600, such that it is up to date and current. The stylesheets may be structured according to specific stylesheet languages including cascading style sheets (CSS).

The platform distribution file repository 604 may receive and store distribution files including code (e.g., JavaScript code, React code, etc.) that is executed by the content management server 112 to generate page frameworks (e.g., hypertense markup language (HTML) files, XML files, etc.). In some embodiments, the content management server 112 may package and output the distribution files to the user computing device (e.g., 120*a*), and the distribution files may be executed by the browser of the user computing device (e.g., 120*a*). In some embodiments, the platform distribution file repository 604 may receive and store platform packages including the platform code, libraries with a specific version, classes and the like.

The platform distribution file repository 604 may further receive and store stylesheets (e.g., Cascading Stylesheets (CSS), etc.) that are executed by the content management server 112 to render a page including an embedded container or HTML element. In some embodiments, the platform distribution file repository 604 may receive and store platform bundles including the platform stylesheets, libraries with a specific version, classes and the like. In some embodiments, the platform distribution file includes the page file. In some embodiments, the platform distribution file includes the page file.

The multiple content repositories 111*a-n* may each be associated with a specific tenant, and serve as a repository to store code, stylesheets, and other data applicable to the specific tenant. Accordingly, each content repository (e.g., 111a-n) may include one or more tenant distribution file repositories 612. In some embodiments, each content repository may include separate code and CSS repositories (not shown). In some embodiments, each content repository (e.g., 111a-n) and the repositories thereof, are maintained by the tenant and an associated user computing device. For instance, the associated user computing device may update or version the data (e.g., the libraries) of the content repositories, such that it is up to date and current. In this regard, the content repositories and the platform repository 600 may be utilizing different versions of the same library, as will be described further herein. In some embodiments, the tenant distribution file includes the container file.

A page may be generated in the specific business context of the first front-end application (e.g., the Research & Development front-end application 208) and displayed on a graphical user interface associated with the first front-end application. For instance, the user computing device may provide tenant code and stylesheets to the content storage system for storage therein. Then, in response to navigating to the page, the content management server 112 may retrieve the tenant code and the tenant stylesheets, which may be used to generate and render an embedded container of the page. The content management server 112 may then retrieve the platform code and stylesheets, and inject the result of the tenant code into the result of the tenant code to generate the page. Finally, the content management server 112 may render the page based on the two sets of stylesheets.

In some embodiments, the content management server 112 may receive a request to perform a specific action (e.g., a create, update, or delete (CRUD) action such as create a data record, update a data record, or delete a data record), and then in response to the specific action being performed, the content management server 112 may retrieve the tenant code and the tenant stylesheets, which may be used to generate and render an embedded container of the page. The content management server 112 may then retrieve the platform code and stylesheets, and inject the result of the tenant code into the result of the tenant code to generate the page. Finally, the content management server 112 may render the page based on the two sets of stylesheets.

In other embodiments, the content management server 112 may receive a request to generate the specific page. For instance, a page (e.g., the example page 1100) may include a button. Then, in response to a selection of the button, the user computing device (e.g., 120a) (or the browser thereof) may generate a request to load and display the specific container. The user computing device 108 may then output the request to the content management server 112, which may retrieve the tenant code and the tenant stylesheets, which may be used to generate and render an embedded container of the page. The content management server 112 may then retrieve the platform code and stylesheets, and inject the result of the tenant code into the result of the tenant code to generate the page. Finally, the content management server 112 may render the page based on the two sets of stylesheets. In some embodiments, the generated container may overlay the button or be displayed in a popup container.

Figure 7:
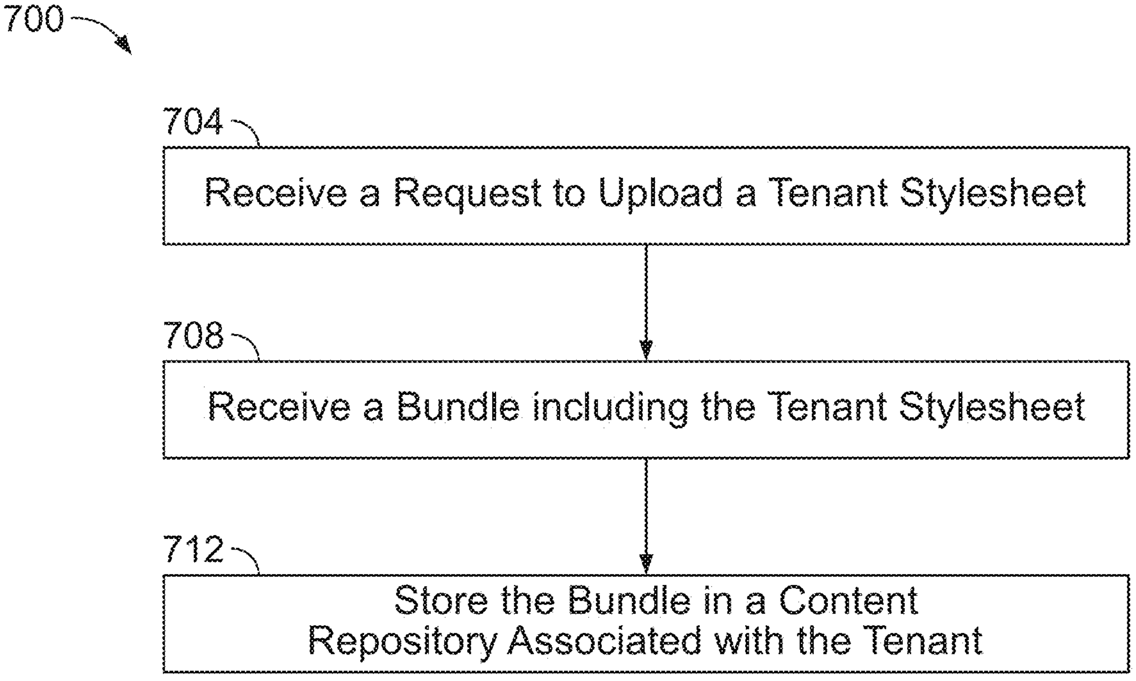
FIG. 7 is a flow diagram of a method for receiving and storing a tenant stylesheet, according to an example embodiment.

Referring now to FIG. 7, a method 700 of receiving a tenant stylesheet is shown, according to an example embodiment. Method 700 can be carried out by the system of FIG. 1. More particularly, the method 700 can be carried out by the content management server 112.

Method 700 commences at step 704 at which the content management server 112 receives a request to upload a stylesheet associated with the tenant (e.g., a tenant stylesheet). In some embodiments, the request may identify a specific tenant and/or front-end application associated with the stylesheet. In some embodiments, the request may be received from one of the user computing devices (e.g., the user computing devices 120a-n). In some embodiments, the request may be a request to access a file upload screen (not shown) for uploading the tenant stylesheet.

Once the content management server 112 has received the request to upload the stylesheet, the method 700 proceeds to step 708 at which the content management server 112 receives a bundle including the tenant stylesheet. In some embodiments, the bundle may be received from one of the user computing devices 120a-n. The bundle may be a stylesheet bundle and include the tenant stylesheet, one or more stylesheet libraries (e.g., multiple stylesheet library files), and one or more stylesheet classes (e.g., multiple stylesheet class files). In some embodiments, the stylesheet library and/or stylesheet class may be a specific version. For instance, the bundle may include version 2.0 of a specific stylesheet library and/or stylesheet class. The versions may indicate a specific time and functionality associated with the library and/or class. In some embodiments, the bundle may include multiple tenant stylesheets, multiple classes, and/or multiple libraries.

In some embodiments, at or before step 708, a user interface may be displayed on the user computing device (e.g., 120a) to upload the tenant stylesheet to the content management server 112. The interface may have an area for the user to input the tenant stylesheet. The browser of the user computing device (e.g., 120a) may receive the stylesheet from another portion of the user computing device (e.g., the memory thereof), and then select a button to send the request to an HTTP endpoint or a uniform resource locator ("URL"). In one implementation, the interface is a user interface. In some embodiments, the tenant stylesheets may be received via an application programming interface (API).

Once the content management server 112 has received the bundle, the method 700 proceeds to step 712 at which the content management server 112 stores the bundle in a content repository (e.g., one of the content repositories 111a-n). In some embodiments, the content management server 112 may search the content storage system 111 for a specific content repository associated with the tenant. For instance, the content management server 112 may store the bundle in one of the tenant distribution repositories 612 associated with the tenant. In some embodiments, the stylesheet may be stored in one of the tenant distribution repositories 612, and the other portions of the bundle (e.g., the classes and/or libraries) may be stored in the platform repository 600 for use throughout the platform.

Figure 8:
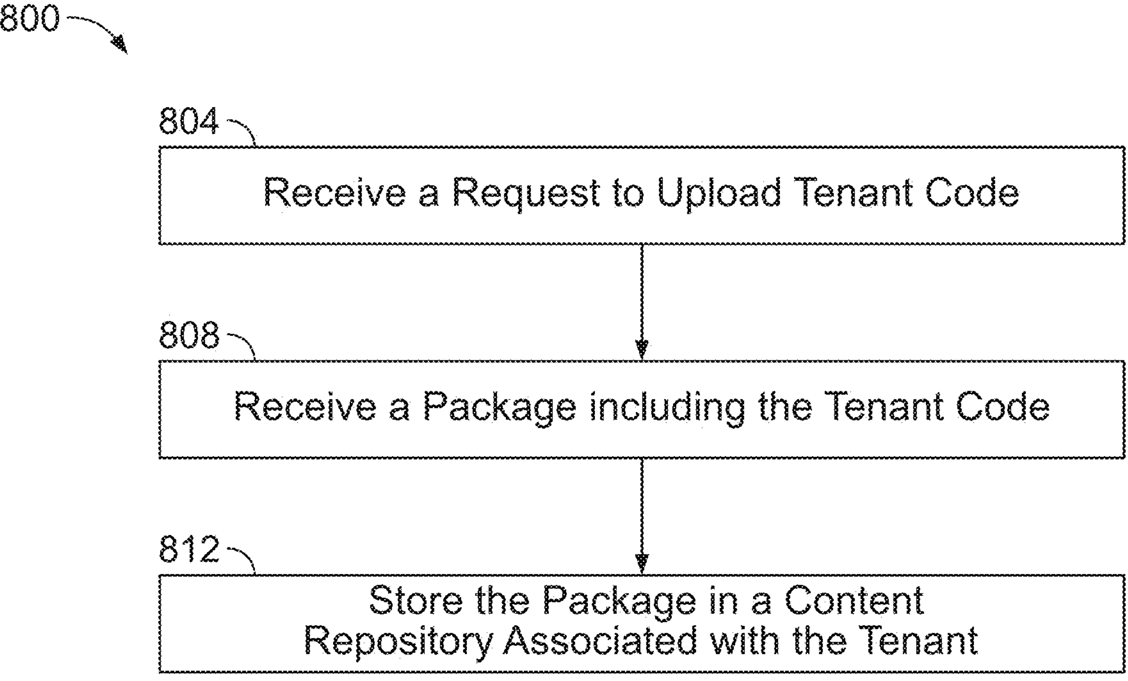
FIG. 8 is a flow diagram of a method for receiving and storing tenant code, according to an example embodiment.

Referring now to FIG. 8, a method 800 of receiving tenant code is shown, according to an example embodiment. Method 800 can be carried out by the system of FIG. 1. More particularly, the method 800 can be carried out by the content management server 112.

Method 800 commences at step 804 at which the content management server 112 receives a request to upload source code (e.g., a source code file) associated with the tenant (e.g., tenant code). In some embodiments, the request may identify a specific tenant and/or front-end application associated with the tenant code. In some embodiments, the request may be received from one of the user computing devices (e.g., the user computing devices 120a-n). In some embodiments, the request may be a request to access a file upload screen (not shown) for uploading the tenant stylesheet.

Once the content management server 112 has received the request to upload the tenant code, the method 800 proceeds to step 808 at which the content management server 112 receives a package including the tenant code (e.g., in a tenant code file). In some embodiments, the package may be received from one of the user computing devices 120*a*-*n*. The package may be a source code package and include the tenant code one or more libraries (e.g., multiple JavaScript library files, multiple React library files, etc.), and one or more classes (e.g., multiple JavaScript class files, etc.). In some embodiments, the library and/or class may be a specific version. For instance, the bundle may include version 2.0 of a specific library and/or class. The versions may indicate a specific time and functionality associated with the library and/or class. In some embodiments, the package may include multiple tenant code files, multiple classes, and/or multiple libraries.

In some embodiments, at or before step 808, an interface may be displayed on the user computing device upload the tenant code to the content management server 112. The interface may have an area for the user to input the tenant code. The user may paste or add the tenant code, and then select a button to send the request to an HTTP endpoint or a uniform resource locator ("URL"). In some embodiments, the tenant code and/or package may be received from the user computing device (e.g., 120*a*) via an API of the content management server 112.

Once the content management server 112 has received the package, the method 800 proceeds to step 812 at which the content management server 112 stores the package in a content repository (e.g., one of the content repositories 111*a*-*n*). In some embodiments, the content management server 112 may search the content storage system 111 for a specific content repository associated with the tenant. For instance, the content management server 112 may store the bundle in one of the tenant distribution repositories 612 associated with the tenant. In some embodiments, the tenant code may be stored in one of the tenant distribution repositories 612, and the other portions of the package (e.g., the classes and/or libraries) may be stored in the platform repository 600 for use throughout the platform.

In some embodiments, the bundle including the one or more tenant stylesheets and the package including the tenant code may be received at the same time in a distribution file. The distribution file may be a compressed file (e.g., a Zip file, a GZIP file, a RAR file, a Parquet file, and the like) including the package and the bundle, as well as a manifest file (which may be a JavaScript object notation (JSON) file) that includes the metadata of the distribution file (e.g., class names, object names, etc.). In some embodiments, the distribution file may be received from one of the user computing device 120*a*-120*n*. In some embodiments, the distribution file may be received via an API of the content management server 112. In some embodiments, the distribution file includes each of the components (e.g., JavaScript files, image files, video files, CSS files, HTML files, and the like) to generate and operate a web application.

In some embodiments, the distribution file may be generated by the user computing device (e.g., 120*a*) via a software development kit ("SDK"). The SDK may be downloaded to a user computing device from the content management server 112 for developing and debugging tenant code. The SDK may be a set of Javascript libraries including the tenant code API's and a few programs. The programs may include a tenant code debugger, which may be a Javascript program. The programs may also include a Javascript debugger. The user may develop some tenant code using the SDK, and temporarily store the tenant code in the user computing device (e.g., 120*a*) for testing and debugging.

The content management server 112 may have a debugging controller (not shown) and a tenant code registry (not shown). The debugging controller could understand requests coming in from the SDK in the user computing device (e.g., 120*a*) and interact with the tenant code debugger. When the debugging is done, the user may submit the tenant code, the CSS, and the other files included in the distribution file to content management server 112. The content management server 112 may receive each file and generate a distribution file including each therein. In some embodiments, the SDK may generate the distribution file and then output the distribution file to the content management server 112.

Once the content management server 112 has received the distribution file, the method the content management server 112 stores the distribution file in a content repository (e.g., one of the content repositories 111*a*-*n*). In some embodiments, the content management server 112 may search the content storage system 111 for a specific content repository associated with the tenant. For instance, the content management server 112 may store the distribution file in one of the tenant distribution repositories 612 associated with the tenant.

Figure 9:
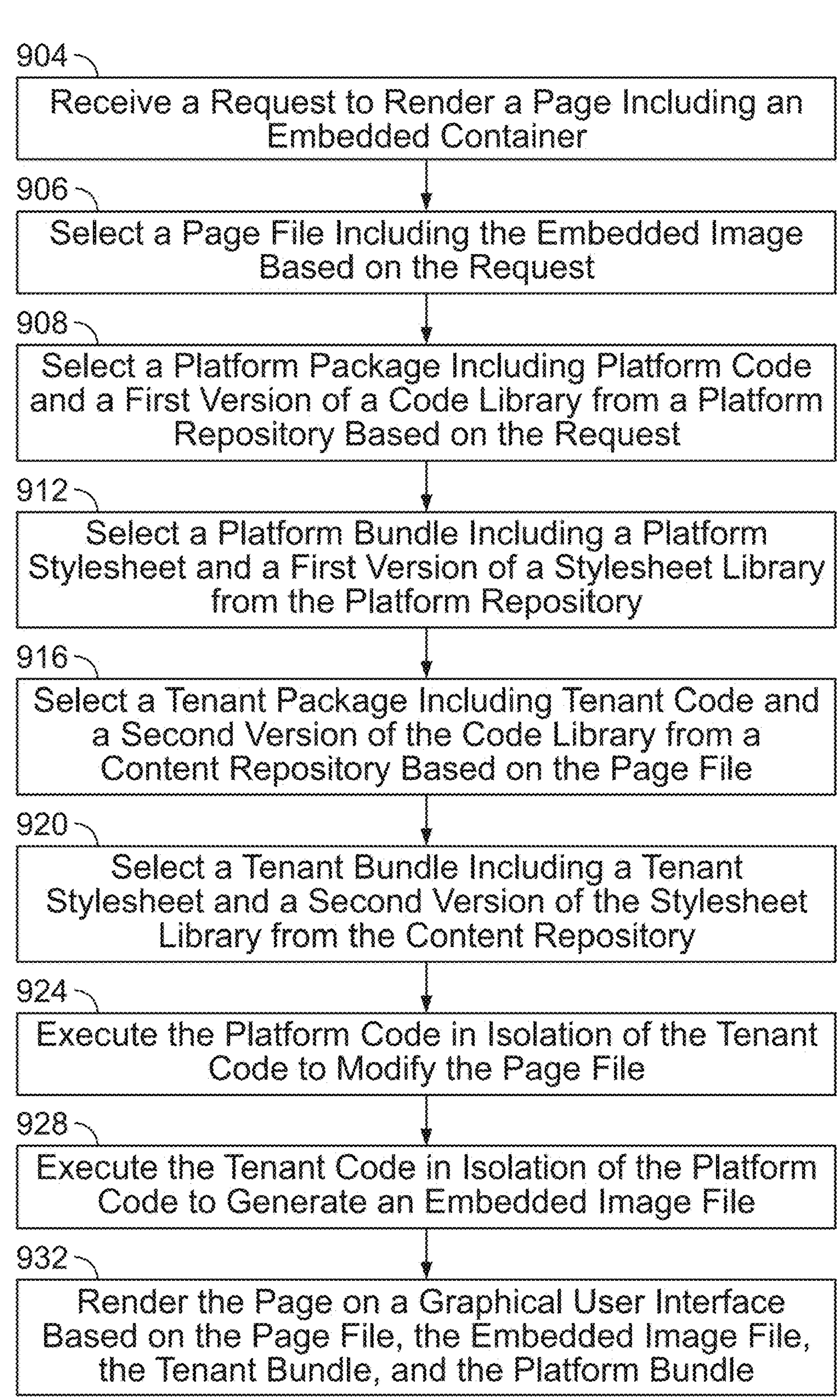
FIG. 9 is a flow diagram of a method for processing and rendering a page via isolated runtime environments, according to an example embodiment.

Referring now to FIG. 9, a method 900 of processing and rendering a page via isolated runtime environments is shown, according to an example embodiment. Method 900 can be carried out by the system of FIG. 1. More particularly, the method 900 can be carried out by the content management server 112. In other embodiments, one or more of the steps of the method 900 can be carried out by one of the user computing devices (e.g., 120*a*) (e.g., via a web browser (browser) thereof).

Method 900 commences at step 904 at which the content management server 112 receives a request to render a page including an embedded container or HTML element. In some embodiments, the request may be received from one of the user computing devices 120*a*-*n*, in response to the user navigating to the specific page. In some embodiments, the request may identify the page and/or the tenant associated with the request. In some embodiments, the page may include multiple embedded containers or HTML elements. In some embodiments, based on the page identified in the request, the content management server 112 may determine the independent portions of the page (e.g., each embedded container/HTML elements).

In some embodiments, the content management server 112 may determine the tenant associated with the request based on the user computing device (e.g., 120*a*) from which the request was received. For instance, the request may be received from a first user computing device (e.g., 120*a*) with login credentials that are associated with a first tenant or customer. Accordingly, the content management server 112 may determine the request is associated with the first tenant based on the request being received from the first user computing device (e.g., 120*a*).

In some embodiments, the request may be received from one of the user computing devices 120*a*-120, in response to the user selecting a specific button or option on the specific page. For instance, the page (e.g., the example page 1100) may include a button (not shown). Then, in response to the user selecting the button, the user computing devices 120*a*-120 may generate a request to render the embedded container or HTML element. In some embodiments, the embedded container may be overlaid or displayed in place of the button.

In other embodiments, the request may be received, in response to a specific action (e.g., creating a data record, deleting a data record, modifying a data record, etc.) For instance, the user computing device (e.g., 120*a*) may generate a request identifying a specific action and a specific data object. In response, the content management server 112 may execute the action, and then generate the request or proceed to step 906 based on the specific action being executed.

Once the provider computing system has received the request, the method may proceed to step 906 where the content management server 112 may retrieve (e.g., from a repository of the content storage system 111, from a repository of one of the front-end applications 113, etc.) or select a page file (e.g., an HTML file, an XML file, etc.) that defines the page and the portions thereof (e.g., the embedded container(s)). For instance, the page file may be an HTML file that defines the structure of the page, and each of the embedded containers or HTML elements. In some embodiments, the page file may be associated with specific page and define a container type of the embedded container. For instance, the embedded container may be displayed in a tab, as a standalone portion of a page, as a specific layout or section inside the page, and/or a panel inside a document. In this regard, the page file may define the location, size, and type of the embedded container.

In some embodiments, the page file may be selected (e.g., from a repository of the content storage system 111, from a repository of one of the front-end applications 113, etc.) based on the received request. For instance, the request may identify a specific page, and the content management server 112 may retrieve the page file associated with the page of the request.

In some embodiments, the embedded container may be a shadow document object model (DOM) included in the page file. A shadow DOM is a separate part of the DOM tree (i.e., the rendered HTML file) that's hidden from the main document. It allows for encapsulation of stylesheets and code from other stylesheets and code of the webpage. Likewise, the page file may include an iframe (short for inline frame) for executing the tenant code and bundle to generate the shadow DOM. An iframe is an HTML element that allows embedding of an independent HTML document inside another HTML document. The iframe acts as a "window" inside the webpage to display a completely separate HTML document. The HTML document is independent because it renders in a separate execution context than the rest of the page, thereby providing isolation to the page. In this regard, the content management server 112 may generate the iframe, execute the tenant code, and add the resulting shadow DOM to the tree DOM.

Once the content management server 112 has selected the page file, the method 900 proceeds to step 908 at which the content management server 112 selects a platform package including platform code and a first version of a code library from the platform repository 600 based on the page of the request and/or the selected page file. In some embodiments, the content management server 112 may retrieve the page file and/or the platform code at the same time (e.g., in the same step).

In some embodiments, the platform code may be represented in a metadata definition language (MDL) representing the code to be executed.

MDL may be similar to Data Definition Language (DDL) in databases, and provide runtime actions to create, describe (read), update, and drop (delete) components of one of the content repositories 111*a-n* make up its configuration. In that regard, MDL is a tool for manipulating data records programmatically. For instance, MDL uses CRUD-like commands to manage data records of the content management system 110. Based on MDL commands, the content management system 112 may use CREATE, RECREATE, RENAME, ALTER, and DROP commands to manage data records of the content management system 110.

In other embodiments, the content management server 112 may select the platform code and modify it, such that the platform code is in the MDL language.

Once content management server 112 has selected the platform package, the method 900 proceeds to step 912 at which the content management server 112 at which the content management server 112 selects the platform bundle including a platform stylesheet and a first version of a stylesheet library from the platform repository 600. In some embodiments, the content management server 112 may select the platform package, the platform bundle, and/or the page file at the same time (e.g., in the same step). In some embodiments, the content management server 112 may select the platform bundle based on the page file (e.g., based on being identified in the page file). In some embodiments, the content management server 112 may retrieve the page file, the platform package, and/or the platform bundle at the same time (e.g., in the same step).

Once the content management server 112 has selected and/or retrieved the page file, the platform package, and the platform bundle, the content management server 112 may instantiate the page file to generate a DOM tree. The DOM tree may be generated based on the page file, the platform package, and the platform bundle and provide the data structure for rendering the page on the user interface, as will be described further herein.

Once the content management server 112 has selected the platform bundle, the method 900 proceeds to step 916 at which the content management server 112 selects a tenant package including tenant code and a second version of the code library from one of the content repositories 111*a*-111*n* based on the page file. For instance, the page file may include a link or URL to the content management repository including the tenant package (e.g., in an iframe). Accordingly, when retrieving the content of the iframe, the content management server 112 may select the tenant package. In some embodiments, the tenant code may be represented in a metadata definition language (MDL) representing the code to be executed.

In some embodiments, the tenant package may include the tenant code and a different code library entirely from the code library of the platform package. A code library is a collection of pre-written reusable code that can be called to perform specific tasks or function (e.g., generate a median value, generate a random value, manipulate HTML, make API requests, and the like). In this regard, the platform package and the tenant package are stored entirely separately and the iframe provides for execution of code in isolation of one another. Accordingly, the tenant package may include a first code library, a second code library, and a third code library, whereas the platform package may include a fourth code library and the first code library. In another example, the tenant package may include a second version of a first code library, a first version of second code library, and a first version of a third code library, whereas the platform package may include a first version of a fourth code library and a first version of the first code library.

Once the content management server 112 has selected the tenant package, the method 900 proceeds to step 920 at which the content management server 112 selects the tenant bundle including a tenant stylesheet and a second version of the stylesheet library from the content repository. In some embodiments, the content management server 112 may select the tenant package and the tenant bundle at the same time (e.g., in the same step). In some embodiments, the content management server 112 may select the tenant bundle based on the embedded container of the page file.

In some embodiments, like the tenant package, the tenant bundle may include the tenant stylesheet and a different stylesheet library entirely from the stylesheet library of the platform bundle. A stylesheet library is a collection of pre-written CSS files that provide instant styling (as compared to having to be manually written). In this regard, the platform bundle and the tenant bundle are stored entirely separately and the Shadow DOM provides for rendering in isolation. Accordingly, the tenant bundle may include a first stylesheet library, whereas the platform bundle may include a fourth stylesheet library. In another example, the tenant bundle may include a second version of a first stylesheet library, whereas the platform bundle may include a first version of the first stylesheet library.

In some embodiments, steps 916 and 920 may be combined, and the content management server 112 may select the distribution file including both. Then, the content management server 112 may extract each from the distribution file and proceed with the method 900, as described further herein.

Once the content management server 112 has selected and/or retrieved the tenant package and/or the tenant bundle, the content management server 112 may instantiate or generate the shadow DOM. The shadow DOM may be generated based on the iframe (or the link therein), the tenant package, and the tenant bundle and provide the data structure for rendering the container, as will be described further herein. In some embodiments, the iframe may point or include a link to a container file, and the shadow DOM may be generated based on the container file. As described herein, the shadow DOM may be generated as a (hidden) part of the DOM tree, such that it is included in the DOM tree but rendered in isolation from the rest of the DOM tree. In this regard, the execution may occur in isolation because each set of tenant code and the platform code may be executed with their own individual memory and thread of execution. In this regard, they are executed in isolation such that they can each utilize their own individual code libraries and CSS libraries to generate and execute the code thereon, and generate a DOM.

Once the content management server 112 has selected the tenant bundle, the method 900 proceeds to step 924 at which the content management server 112 executes the platform code in isolation of the tenant code to modify the page file or the DOM instantiated based on the page file. For instance, the content management server 112 may modify the page file or DOM to add values, change files, create values, and/or restructure the page, as directed by the platform code. Likewise, the platform code may be executed in isolation, and in a separate runtime environment, of the tenant code to prevent leakage and/or overlap between the platform code and the tenant code. Because the tenant code and the platform code are updated at different times and maintained by two different entities (the tenant vs. the platform), the two sets of code may be out of synch and include different versions of libraries, classes, and the like. In this regard, if the two were not isolated and the tenant code utilized the same runtime environment as the platform code, the tenant code would likely "break" or crash when the platform code is updated (e.g., when classes are versioned, when libraries are versioned, etc.). Accordingly, the content management server 112 may execute the platform code in isolation of the tenant code.

Once the content management server 112 has executed the platform code to modify the page file or the DOM, the method 900 proceeds to step 928 at which the content management server 112 executes the tenant code in isolation of the platform code to generate an embedded image or container file. For instance, the content management server 112 may generate an HTML file including multiple values, containers, and the like. The tenant code may be executed in isolation of the platform code (e.g., in its own runtime environment) to prevent leakage between the two sets of code, as described herein.

In some embodiments, prior to step 928 and/or 912, the content management server 112 may select an embedded image or container file from the content repository (e.g., 111*a*), and then generate the shadow DOM based on the embedded image or container file. Then, at step 928, the provider computing system 104 may execute the tenant code to modify the shadow DOM. For instance, the content management server 112 may modify the shadow DOM to add values, change files, create values, and/or restructure the page, as directed by the tenant code.

Once the content management server 112 has executed the tenant code, the method 900 proceeds to step 932 at which the content management server 112 renders the page or the DOM tree on a graphical user interface based on the page file, the embedded image file, the tenant bundle, and the platform bundle. In some embodiments, at step 932, the graphical user interface represented by the DOM tree may be displayed on a display of the user computing device (e.g., 120*a*). In some embodiments, as described herein, the shadow DOM and the DOM tree may be rendered in isolation such that different CSS bundles (the tenant bundle and the platform bundle) are applied to each and prevented from being applied to the other. In some embodiments, the step 932 and rendering the page or the DOM tree on the graphical user interface may be performed by the user computing device (e.g., 120*a*) or a browser thereof.

In some embodiments, the page may include multiple embedded containers or HTML elements. Accordingly, steps 916, 920, and 928 may be repeated multiple times for each embedded container or HTML element. For instance, the page may include three embedded containers, which are each associated with a separate distribution file (separate tenant code and stylesheets). Accordingly, the content management server 112 may perform steps 916, 920, and 928 three separate times for each embedded container. In this regard, each page may include multiple embedded containers which are all generated and executed in isolation of one another.

Figure 10:
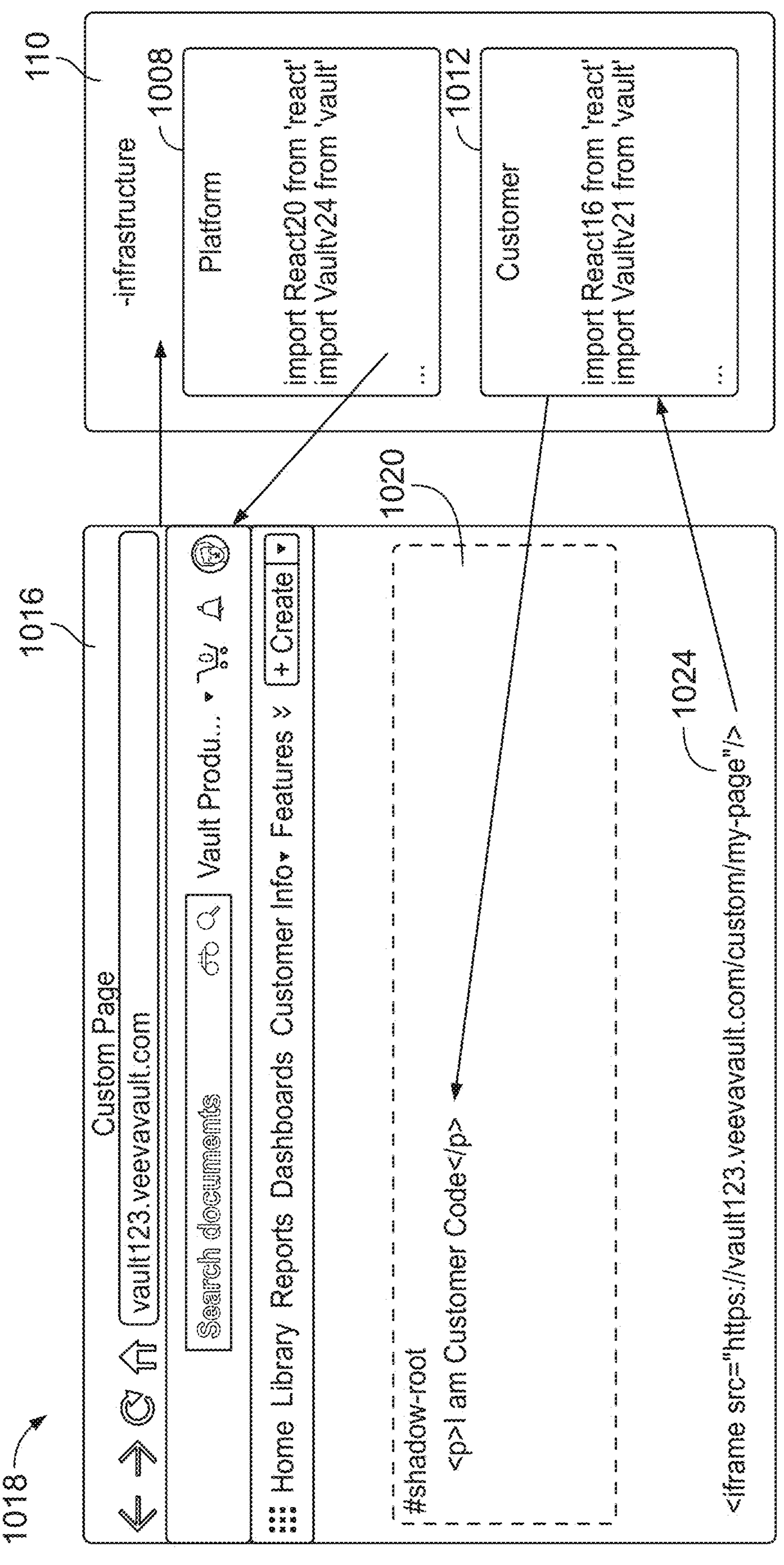
FIG. 10 is a high-level diagram and data flow for processing and rendering the page, according to an example embodiment.

Referring now to FIG. 10, a system diagram and data flow is shown according to an example embodiment. As shown, the content management system 110 include platform code 1008 (e.g., stored in the platform repository 600) and customer or tenant code 1012 (e.g., stored in a content storage repository. Likewise, a webpage 1016 is represented by a page file or tree DOM 1018 including a shadow DOM 1020 representing the embedded container and a hidden iframe 1024. In runtime, the page file or tree DOM 1018 is parsed thereby causing execution of the hidden iframe 1024.

In response, the content management server 112 executes the tenant code 1012 and populates the shadow DOM with the resulting code. Likewise, the content management server 112 then executes the platform code 1008, in isolation of the tenant code 1012, and modifies the tree DOM 1018, which is then rendered.

Figure 11:
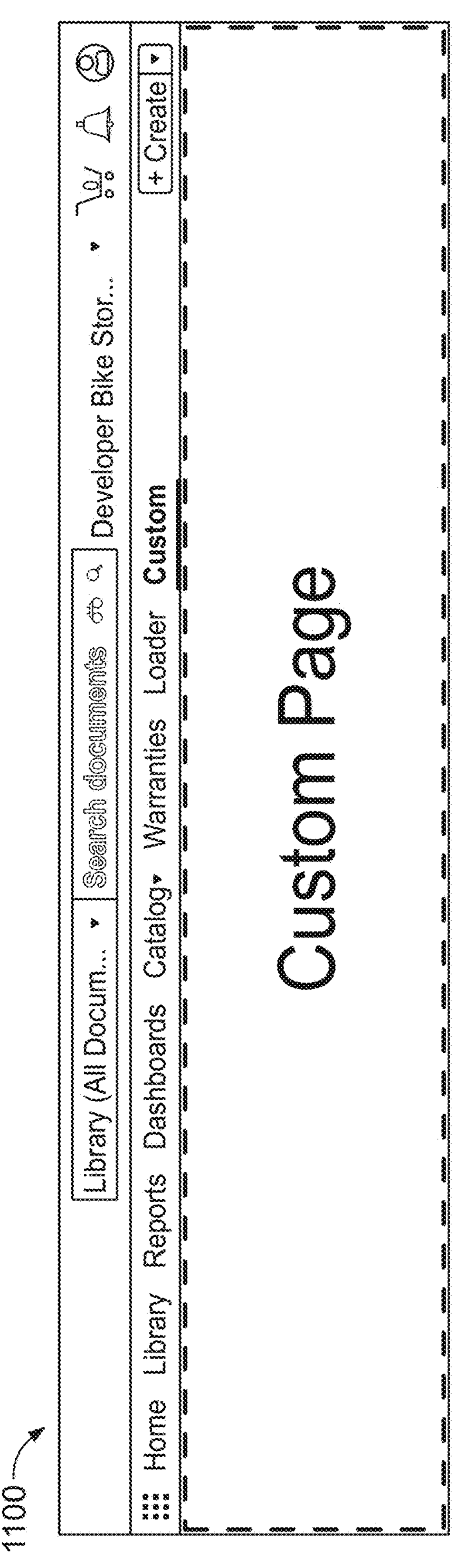
FIG. 11 is an illustration of a user interface displayed by the enterprise content management architecture of FIG. 1 to display a rendered page.

Referring now to FIG. 11, an example page 1100 is shown according to an example embodiment. In the example shown, the embedded container is a tab (e.g., "custom"), which may be selected to cause execution of the tenant code and display thereon. As shown, the embedded container may be a custom page that includes separate stylesheet libraries and code libraries to that of the platform page "Home," "Library," etc. By doing so, the embedded container provides for isolation from the platform, thereby preventing the intermingling of non-applicable libraries. For instance, the platform may utilize a first version of a stylesheet library, whereas the embedded container may utilize a second version of the stylesheet library, but both may be displayed in the same user interface.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112(f), unless the element is expressly recited using the phrase "means for."

As used herein, the term "circuit," "controller," "extractor," "service," or "application(s)"/"app(s)" may include hardware configured to execute the functions described herein. In some embodiments, each respective "circuit," "controller," "extractor," or "application(s)"/"app(s)" may include machine-readable media for configuring the hardware to execute the functions described herein. The "circuit," "controller," "extractor," "service," or "application(s)"/"app(s)" may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit," "controller," "extractor," "service," or "application(s)"/"app(s)" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit," "controller," "extractor," "service," or "application(s)"/"app(s)" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be configured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components configured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that the term "field," as described herein may include any form of an input field through which the user interfaces shown and described may receive input from a user of a computing device. For instance, the term "field" may include a text field, a drop-down box and selectable options, a list box, a lookup box, a search bar, an icon, one or more checkboxes, one or more radio buttons, a button, a toggle, a date field, a slider, and the like. Further, each "field" may include and/or receive data that may be associated with a data object as described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for facilitating the isolated render of a user interface, the method comprising:

receiving, by a content management server, a request to render a page file including an embedded container;

selecting, by the content management server, a platform package from a platform repository based on the request, wherein the platform package includes platform code and a first code library;

selecting, by the content management server, a platform bundle from the platform repository based on the request, wherein the platform bundle includes a first stylesheet library;

selecting, by the content management server, a tenant package from a tenant repository based on the request, wherein the tenant package includes tenant code and a second code library;

selecting, by the content management server, a tenant bundle from the tenant repository based on the request, wherein the tenant bundle includes a second stylesheet library;

transmitting, by the content management server, the page file, the tenant package, the tenant bundle, the platform package, and the platform bundle to a user computing device, and wherein the platform code of the platform package includes instructions configured to cause the user computing device to:

generate a document object model (DOM) tree based on the page file; and modify the DOM tree, and wherein the tenant code of the tenant package includes instructions configured to cause the user computing device to:

generate a shadow DOM depending from the DOM tree; and modify the shadow DOM, wherein the platform code is executed in isolation of the tenant code, and wherein the tenant code is executed in isolation of the platform code.

2. The method of claim 1, further comprising:

rendering, by the user computing device, the DOM tree to enable display of a user interface.

3. The method of claim 1, wherein the first code library and the second code library are different code libraries.

4. The method of claim 1, wherein the first code library and the second code library are each the same code library, wherein the first code library is a first version, and wherein the second code library is a second version, and wherein the first version and the second version are different versions.

5. The method of claim 1, wherein the first stylesheet library and the second stylesheet library are different stylesheet libraries.

6. The method of claim 1, wherein the first stylesheet library and the second stylesheet library are each the same stylesheet library, wherein the first stylesheet library is a first version, and wherein the second stylesheet library is a second version, and wherein the first version and the second version are different versions.

7. The method of claim 1, wherein the page file includes an embedded link including a link to a container file, and wherein the method further comprises:

retrieving, by the content management server, the container file of the embedded link, wherein the shadow DOM is generated based on the container file.

8. The method of claim 1, further comprising:

determining, by the content management server, a tenant associated with the request, wherein the tenant package and the tenant bundle are selected from the tenant repository based on the tenant repository being associated with the determined tenant.

9. A method for facilitating the isolated render of a user interface, the method comprising:

receiving, by a content management server, a request to render the user interface;

selecting, by the content management server, a platform distribution file from a platform repository based on the request, wherein the platform distribution file includes a page file, a platform package, and a platform bundle, wherein the platform package includes platform code and a first code library, and wherein the platform bundle includes a first stylesheet library;

selecting, by the content management server, a tenant distribution file from a tenant repository based on the request, wherein the tenant distribution file includes a tenant package and a tenant bundle, wherein the tenant package includes tenant code and a second code library, and wherein the platform bundle includes a second stylesheet library;

transmitting, by the content management server, the tenant distribution file and the platform distribution file to a user computing device, wherein the platform code of the platform distribution file includes instructions configured to cause the user computing device to:

generate a document object model (DOM) tree based on the page file; and modify the DOM tree, and wherein the tenant code of the tenant distribution file includes instructions configured to cause the user computing device to:

generate a shadow DOM depending from the DOM tree; and modify the shadow DOM, wherein the platform code is executed in isolation of the tenant code, and wherein the tenant code is executed in isolation of the platform code.

10. The method of claim 9, further comprising:

rendering, by the user computing device, the DOM tree to enable display of a user interface.

11. The method of claim 9, wherein the first code library and the second code library are different code libraries.

12. The method of claim 9, wherein the first code library and the second code library are each the same code library, wherein the first code library is a first version, and wherein the second code library is a second version, and wherein the first version and the second version are different versions.

13. The method of claim 9, wherein the first stylesheet library and the second stylesheet library are different stylesheet libraries.

14. The method of claim 9, wherein the first stylesheet library and the second stylesheet library are each the same stylesheet library, wherein the first stylesheet library is a first version, and wherein the second stylesheet library is a second version, and wherein the first version and the second version are different versions.

15. The method of claim 9, wherein the page file includes an embedded link including a link to a container file, and wherein the method further comprises:

retrieving, by the content management server, the container file of the embedded link, wherein the shadow DOM is generated based on the container file.

16. The method of claim 9, further comprising:

determining, by the content management server, a tenant associated with the request, wherein the tenant distribution file is selected from the tenant repository based on the tenant repository being associated with the determined tenant.

17. A method for facilitating the isolated render of a user interface, the method comprising:

receiving, by a content management server, a request to render a page file including an embedded container;

selecting, by the content management server, a platform distribution file from a platform repository based on the request, wherein the platform distribution file includes a platform package and a platform bundle, wherein the platform package includes platform code and a first code library, and wherein the platform bundle includes a first stylesheet library;

selecting, by the content management server, a tenant distribution file from a tenant repository based on the request, wherein the tenant distribution file includes a tenant package and a tenant bundle, wherein the tenant package includes tenant code and a second code library, and wherein the platform bundle includes a second stylesheet library;

outputting, by the content management server, the page file, the platform distribution file, and the tenant distribution file to a user computing device;

generating, by the user computing device, a document object model (DOM) tree based on the page file;

generating, by the user computing device, a shadow DOM depending from the DOM tree;

executing, by the user computing device, the platform code in isolation of the platform code to modify the DOM tree;

executing, by the user computing device, the tenant code in isolation of the platform code to modify the shadow DOM.

18. The method of claim 17, further comprising:

rendering, by the user computing device, the DOM tree to enable display of a user interface.

19. The method of claim 17, wherein the first code library and the second code library are different code libraries.

20. The method of claim 17, wherein the first code library and the second code library are each the same code library, wherein the first code library is a first version, and wherein the second code library is a second version, and wherein the first version and the second version are different versions.

* * * * *